US012560946B2

(12) United States Patent　　　　(10) Patent No.:　US 12,560,946 B2
Tangade et al.　　　　　　　　　　(45) Date of Patent:　Feb. 24, 2026

(54) USING SIMULATED ENVIRONMENTS TO IMPROVE AUTONOMOUS ROBOT OPERATION IN REAL ENVIRONMENTS

(71) Applicant: NVIDIA Corporation, Santa Clara, CA (US)

(72) Inventors: Sameer Tangade, Pune (IN); Ajay Meshram, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 88 days.

(21) Appl. No.: 18/640,179

(22) Filed: Apr. 19, 2024

(65) Prior Publication Data

US 2025/0328139 A1　　Oct. 23, 2025

(51) Int. Cl.
| | |
|---|---|
| *G05D 1/229* | (2024.01) |
| *G05D 1/246* | (2024.01) |
| *G05D 1/247* | (2024.01) |
| *G05D 1/622* | (2024.01) |
| *G05D 101/15* | (2024.01) |

(52) U.S. Cl.
CPC ........... *G05D 1/229* (2024.01); *G05D 1/2462* (2024.01); *G05D 1/2465* (2024.01); *G05D 1/247* (2024.01); *G05D 1/622* (2024.01); *G05D 2101/15* (2024.01)

(58) Field of Classification Search
CPC .... G05D 1/229; G05D 1/0011; G05D 1/0038; G05D 1/226; G05D 1/2465; G05D 1/0022; G05B 13/027; G05B 19/4069; G06F 30/15; G06F 11/3684; G06F 30/27; B25J 9/1671; B25J 9/1605; B25J 11/005; B25J 9/1697; B25J 9/1633; A63F 13/803; G06N 3/006; G06N 3/0475; G06N 3/045; G06N 3/044; G06N 3/008; G06T 5/70; B60W 40/06; G06V 20/56; G06Q 10/047
See application file for complete search history.

(56) References Cited

U.S. PATENT DOCUMENTS

| | | | | |
|---|---|---|---|---|
| 9,751,212 | B1 * | 9/2017 | Martinson | .............. G06N 3/008 |
| 10,133,273 | B2 * | 11/2018 | Linke | ................... G05D 1/0022 |
| 10,795,327 | B2 * | 10/2020 | Gray | ................... G05B 13/027 |

(Continued)

OTHER PUBLICATIONS

"What Is Isaac Sim—Omniverse Isaac Sim latest documentation", docs.omniverse.nvidia.com, retrieved from the internet on Apr. 19, 2024, 5 pages.

(Continued)

*Primary Examiner* — Yuri Kan
(74) *Attorney, Agent, or Firm* — Lowenstein Sandler LLP

(57)　　　ABSTRACT
Disclosed are apparatuses, systems, and techniques that train and use trained language models to assist users with complex systems installation, troubleshooting, and/or maintenance. A method can include generating, for a real environment including a real robot having one or more real sensors, a simulated environment modeling the real environment, the simulated environment including a simulated robot corresponding to the real robot, the simulated robot including one or more simulated sensors corresponding to the one or more real sensors, obtaining simulated data based at least on simulated sensor data collected using the one or more simulated sensors, and using the simulated data to control operation of the real robot within the real environment.

20 Claims, 6 Drawing Sheets

(56) References Cited

U.S. PATENT DOCUMENTS

| | | | | | |
|---|---|---|---|---|---|
| 11,928,399 | B1* | 3/2024 | Dolan | | G06F 30/15 |
| 2013/0178980 | A1* | 7/2013 | Chemouny | | B25J 9/1671 |
| | | | | | 700/255 |
| 2013/0311153 | A1* | 11/2013 | Moughler | | G06Q 10/047 |
| | | | | | 703/6 |
| 2019/0219972 | A1* | 7/2019 | Gray | | G05D 1/0011 |
| 2019/0344449 | A1* | 11/2019 | Williams | | B25J 9/1605 |
| 2023/0041258 | A1* | 2/2023 | Okizaki | | B25J 11/005 |
| 2023/0070517 | A1* | 3/2023 | Sharma | | G06F 11/3684 |
| 2023/0076433 | A1* | 3/2023 | Pathak | | G06F 30/27 |
| 2023/0206781 | A1* | 6/2023 | Robinson | | A63F 13/803 |
| | | | | | 434/43 |
| 2023/0290133 | A1* | 9/2023 | Wulfmeier | | G06N 3/006 |
| 2024/0013542 | A1* | 1/2024 | Satoh | | G06N 3/006 |
| 2024/0101150 | A1* | 3/2024 | Pronovost | | G06N 3/0475 |
| 2024/0190004 | A1* | 6/2024 | Bai | | B25J 9/1697 |
| 2024/0210942 | A1* | 6/2024 | Pronovost | | G06N 3/045 |
| 2024/0211731 | A1* | 6/2024 | Pronovost | | G05B 19/4069 |
| 2024/0211797 | A1* | 6/2024 | Pronovost | | G06N 3/044 |
| 2024/0212360 | A1* | 6/2024 | Pronovost | | G06T 5/70 |
| 2024/0248470 | A1* | 7/2024 | Montoya | | G05D 1/0038 |
| 2024/0320132 | A1* | 9/2024 | Schyr | | G06F 11/3684 |
| 2025/0002048 | A1* | 1/2025 | Zeng | | B60W 40/06 |
| 2025/0068160 | A1* | 2/2025 | Mariani | | G05D 1/226 |
| 2025/0074466 | A1* | 3/2025 | Binotto | | G06V 20/56 |
| 2025/0091201 | A1* | 3/2025 | Li | | B25J 9/1633 |

OTHER PUBLICATIONS

Nvidia, "Digital Twins", https://www.nvidia.com/en-us/omniverse/solutions/digital-twins/, retrieved from the internet on Feb. 22, 2024, 9 pages.

Nvidia, "Isaac Sim—Robotics Simulation and Synthetic Data", https://developer.nvidia.com/isaac-sim, retrieved from the internet on Feb. 22, 2024, 17 pages.

* cited by examiner

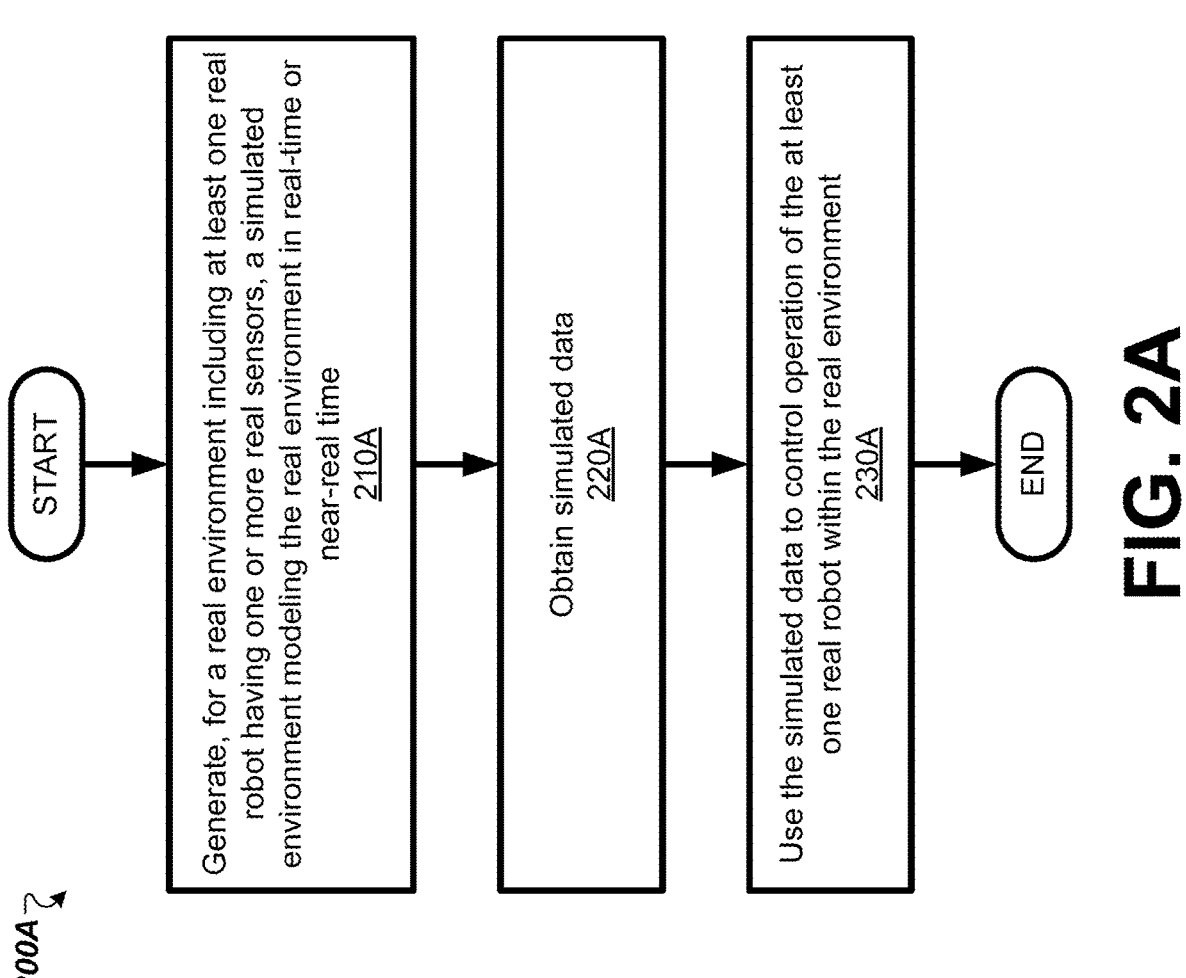

200A

START

Generate, for a real environment including at least one real robot having one or more real sensors, a simulated environment modeling the real environment in real-time or near-real time
210A Obtain simulated data
220A Use the simulated data to control operation of the at least one real robot within the real environment
230A

END

FIG. 2A

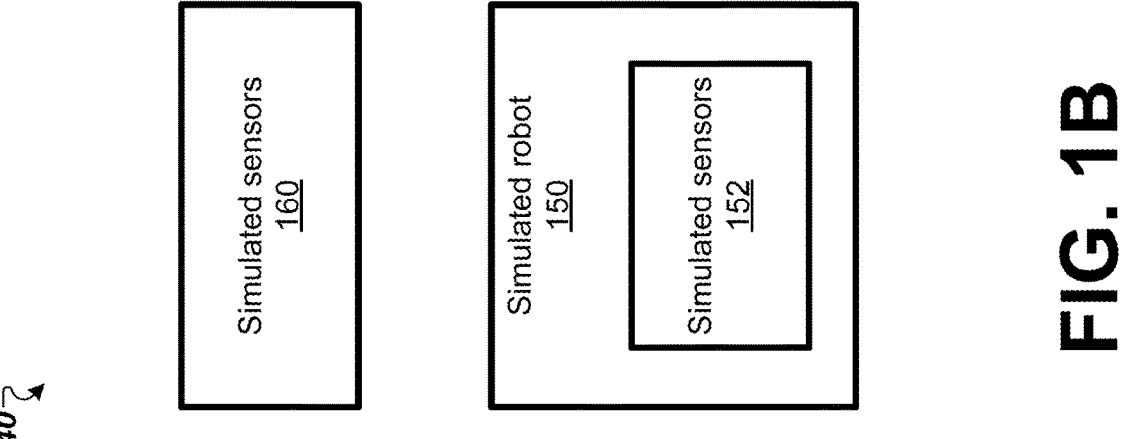

140

Simulated sensors
160

Simulated robot
150

Simulated sensors
152

FIG. 1B

USING SIMULATED ENVIRONMENTS TO IMPROVE AUTONOMOUS ROBOT OPERATION IN REAL ENVIRONMENTS

TECHNICAL FIELD

At least one embodiment pertains to autonomous robots. For example, at least one embodiment pertains to systems and techniques for using simulated environments—such as digital twins—to improve autonomous robot operation (e.g., navigation and decision-making capabilities) in real environments.

BACKGROUND

Autonomous and semi-autonomous robots have emerged as tools across various industries, including manufacturing, logistics, healthcare, agriculture, and exploration. At least one autonomous robot can be designed to operate without human intervention to execute tasks in at least one environment. An autonomous robot can navigate an environment with obstacle avoidance and path planning using environment data, such as predefined maps and/or sensor data obtained from a set of sensors attached to the autonomous robot. For example, an autonomous robot can navigate an environment using a machine learning model trained to identify paths and/or avoid obstacles based on the environment data.

BRIEF DESCRIPTION OF DRAWINGS

FIGS. 1A-1B are block diagrams of an example system for using simulated environments to improve autonomous robot operation (e.g., navigation and decision-making capabilities) in real-world environments, according to at least one embodiment;

FIG. 2A is a flow diagram of an example method of using simulated environments to improve autonomous robot operation (e.g., navigation and decision-making capabilities) in real-world environments, according to at least one embodiment;

DETAILED DESCRIPTION

Figure 1A:
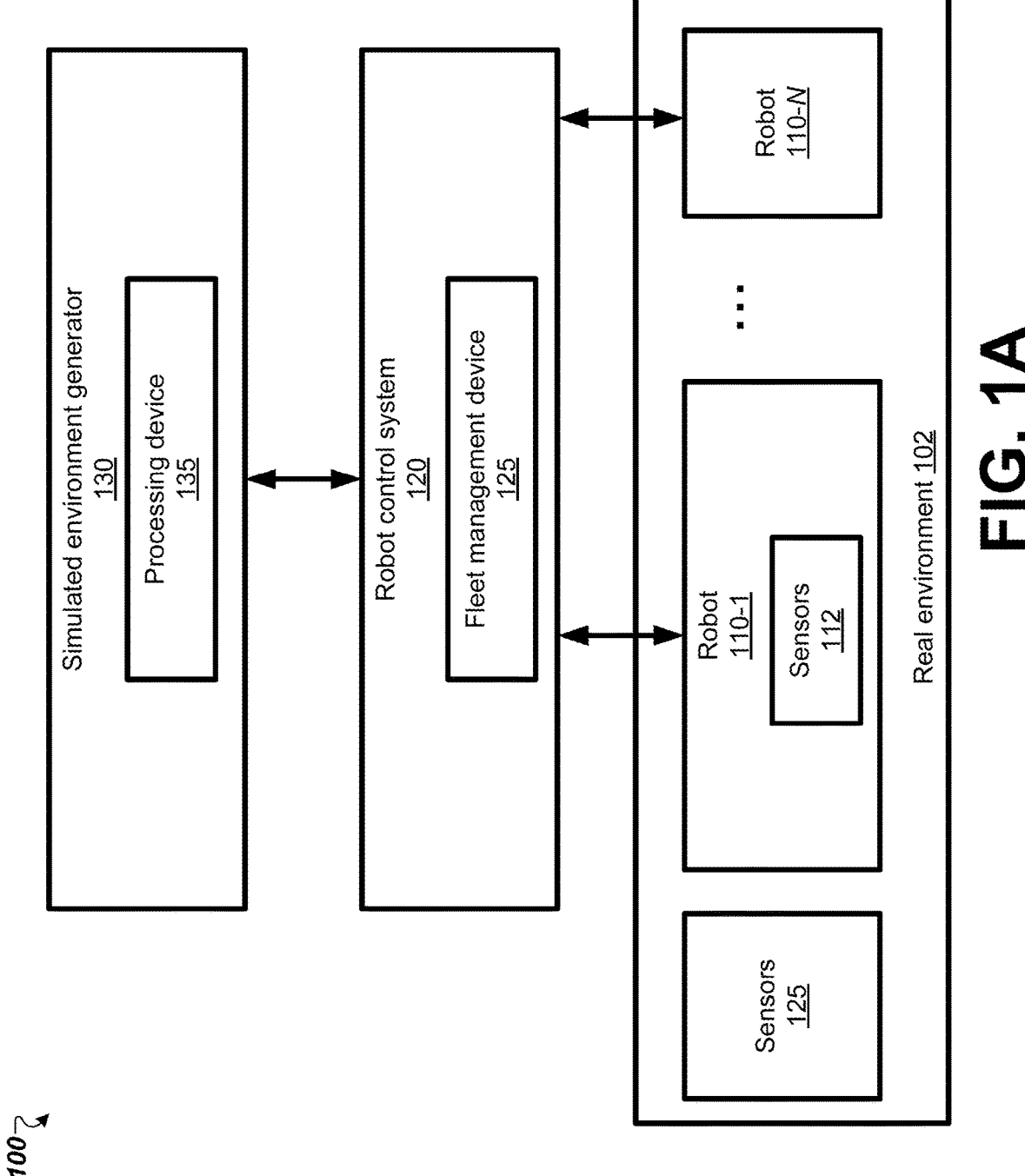

Embodiments of the present disclosure are related to using simulated environments—such as geometrically and physically accurate and realistic virtual recreations or representations, e.g., digital twins—to improve autonomous and semi-autonomous robot operation (e.g., navigation and decision-making capabilities) in real environments. A fleet of autonomous robots ("robots") can operate in an environment, such as a warehouse, a factory, etc. For example, the fleet of robots can be controlled by a fleet management server. A robot can navigate a path within the environment using sensor data collected from a set of sensors located on the robot. More specifically, the sensor data allow the robot to "see" the environment, which can be processed by the robot to make operational decisions within the environment (e.g., using a machine learning model). For example, the set of sensors can include at least one camera, at least one LiDAR sensor, at least one RADAR sensor, at least one SONAR sensor, at least one ultrasonic sensor, at least one inertial measurement unit (IMU), at least one tactile (e.g., touch) sensor, etc.

Some autonomous robots face significant challenges in adapting to complex and unstructured environments. For example, some navigation methods used by autonomous robots can struggle to handle dynamic obstacles, changing terrains, or ambiguous scenarios, limiting practicality and reliability. Furthermore, some autonomous robots may not fully exploit the available sensory data or lack robust decision-making capabilities required for navigating uncertain or novel situations.

For example, a robot in a real environment may, during operation, encounter a scenario in which the robot fails to navigate the real environment in an efficient manner. These scenarios can be caused by sensor field of view limitations. For example, the robot may get stuck at some location within the real environment. One way that a robot can get stuck in a real environment is that the robot can automatically stop operating if the robot cannot identify a suitable path or does not have high enough confidence in perception information to navigate within the real environment from the sensor data and/or map data. As another example, the robot may decide to navigate a non-optimal path within the real environment due to lack of information.

Traditionally, once a robot becomes stuck, a user can manually control the robot to navigate the robot out of the situation that caused the robot to become stuck. However, this requires manual oversight of robots by the user, and/or may result in delay as the robot waits for an available human operator to steer or control the robot out of the current situation. Failure to assist a robot (e.g., rescue a stuck robot) can lead to decreased overall efficiency within the environment (e.g., increased operational downtime, increased manual labor cost, increased robot traffic congestion and/or increased fleet inefficiency). Additionally, manual intervention to rescue stuck robots requires monitoring by real persons, increasing operating cost of robots.

Aspects and embodiments of the present disclosure address these and other technological challenges by providing for systems and techniques that use simulated environments (e.g., physically and/or geometrically accurate virtual representations, such as digital twins) to improve autonomous robot operation (e.g., navigation and decision-making capabilities) in real environments. A system including at least one processing device can create, generate, instantiate (an already generated, and dynamically updated), etc. a simulated environment that replicates a real environment. The simulated environment can be a "digital twin" that is a virtual representation of a real-world ("real") environment including a fleet of robots. That is, the simulated environment is a virtual environment that mimics the real environment in terms of its characteristics, behavior, physics, geometry, materials, object/feature locations, and/or performance. The system can use various sources of data to generate a—or operate within a previously generated—simulated environment in real-time or near real-time that accurately and precisely represent the real environment. Such data may include sensor data obtained from sensors in the real environment (e.g., real robot sensors and/or external sensors within the real environment), telemetry data, computeraided design (CAD) models, historical data, imaging data, building plans, and/or other relevant information. In at least one embodiment, the simulated environment is implemented using NVIDIA Isaac Sim™, which is a robotics simulation platform or toolkit for the NVIDIA Omniverse™ platform. In at least one embodiment, the simulation may be created within a metaverse application. In at least one embodiment, the simulation may be generated using one or more large language models (LLMs) and/or vision language models (VLMs).

For example, the system can initialize a simulated environment modeling a real environment from an initial set of data (e.g., CAD model, sensor data (e.g., LiDAR sweeps, image data, etc.)). The system can then update (e.g., continuously update) the simulated environment in real-time or near real-time based on real data obtained from the real environment (e.g., sensor data from real robot sensors and/or external sensors—such as camera systems in a smart cities application—within the environment). For example, the system can identify, from the real data, that a new object exists in the real environment, and then update the simulated environment to include the new object.

A simulated environment modeling a real environment can include a set of simulated sensors that simulate behavior of real sensors within the real environment. A simulated sensor, also referred to as a virtual sensor, can be implemented using a sensor model designed to simulate behavior of a real sensor. For example, a camera sensor model can be designed to simulate behavior of a real camera, a LiDAR sensor model can be designed to simulate behavior of a real LiDAR sensor, etc. A sensor model can be created based on sensor parameters, such as sampling rate, precision, noise levels, response time, calibration, and/or any other relevant parameters. A sensor model can be further created based on environmental parameters relating to environment factors that can impact sensor readings, such as temperature, humidity, vibration, and electromagnetic interference, etc. In at least one embodiment, the simulated sensors can be created with improved, additional, or alternative parameters, functionality, or performance that may not be feasible, possible, or cost effective for real-world deployments.

In at least one embodiment, at least a subset of a set of simulated sensors is located on at least one robot. In at least one embodiment, at least a subset of a set of simulated sensors includes a set of external simulated sensors located at some location within the simulated environment external to the at least one robot. In at least one embodiment, the system generates the simulated environment to include a set of additional simulated sensors that do not correspond to the set of real sensors. Since the simulated sensors are not real, physical components, there is no monetary cost to adding the set of additional simulated sensors within the simulated environment. However, adding too many simulated sensors can be computationally expensive for the system rendering the simulated environment. Examples of simulated sensors include cameras, LiDAR sensors, RADAR sensors, SONAR sensors, ultrasonic sensors, IMUs, tactile (e.g., touch) sensors, etc. Simulated sensors may generate simulated sensor data based on information about the environment that a specific robot within the environment might not have access to. By adding the simulated sensors to the digital twin (e.g., for a given robot), additional sensor data may be provided for the robot, which may enable the robot to make informed decisions about its path or behavior.

The system may generate a simulated environment modeling a real environment in real-time or near real-time during operation of at least one real robot within the real environment. The simulated environment can include at least one simulated robot, also referred to as a virtual robot, corresponding to the at least one real robot.

Generally, the system can generate a simulated environment, also referred to as a virtual environment, modeling a real environment to identify a path for the real robot to navigate within the real environment (e.g., regardless of whether a real robot is stuck within the real environment). For example, various paths for a simulated robot can be tested within the simulated environment, and an optimal path for the simulated robot can be identified as the path for the real robot to navigate in the real environment. Identifying the path for the real robot to navigate with the real environment can include experimenting with alternative simulated paths within the simulated environment and/or adding simulated sensors to the simulated environment to enhance the perception and navigation capability of the simulated robot. A set of additional simulated sensors (e.g., one or more simulated sensors) may be added to the simulated environment to identify a path for a real robot to navigate within the real environment. For example, the set of additional simulated sensors can include one or more simulated sensors attached to at least one simulated robot and/or one or more simulated sensors external to the at least one simulated robot. Examples of additional simulated sensors include cameras, LiDAR sensors, RADAR sensors, SONAR sensors, ultrasonic sensors, IMUs, tactile (e.g., touch) sensors, etc.

As mentioned above, adding too many simulated sensors can be computationally expensive for the system rendering the simulated environment. Accordingly, the set of additional simulated sensors may include a minimum combination of one or more additional simulated sensors that are sufficient to identify a path for the real robot to navigate within the real environment.

In at least one embodiment, in addition to adding or exchanging sensors on the virtual representation of the real robot, or adding environmental sensors to the virtual representation or simulation of the environment, one or more additional robots may be added to the environment with their own set of one or more sensors to help observe the environment and provide feedback for determining a path or next operation for the real robot in the real-world environment. In at least one embodiment, one or more sensors may be added to the virtual simulation/representation that would be impossible in a real-world environment, such as by adding one or more sensors floating above, near, or around the simulated robot within the simulation such that different view or vantage points can be captured to allow for a better understanding of the simulated environment—and thus the real-world environment—that otherwise would not be possible if complying to physical constraints of the real-world.

For example, the system can generate a simulated environment upon detecting that a real robot has encountered a scenario or condition during operation in the real environment in which the real robot fails to navigate the real environment in an efficient manner. Alternatively, the simulated environment may be generated before encountering such scenarios or conditions. Illustratively, if a real robot gets stuck while navigating the real environment, then the system can generate the simulated environment in which simulated rescue strategies can be tested in real-time or near real-time. Accordingly, instead of relying on manual intervention, the system can be used to, in real-time or near real-time, identify and test a simulated operational strategy within the simulated environment before deployment to the real robot within the real environment. Once a set of actions (e.g., a set of movements) is determined for a robot in the simulated environment, the set of actions may be provided to the real robot, and the real robot may then carry out the set of actions (e.g., to navigate around an obstacle).

A set of additional simulated sensors may be added to the simulated environment to identify paths for rescuing a real robot detected as being stuck within the real environment In at least one embodiment. For example, the set of additional simulated sensors can include one or more additional simulated sensors attached to a simulated robot corresponding to the real robot stuck within the real environment, one or more additional simulated sensors attached to a simulated robot corresponding to a real robot that is not the stuck robot, and/or one or more additional simulated sensors external to the simulated robots. Examples of additional simulated sensors include cameras, LiDAR sensors, RADAR sensors, SONAR sensors, ultrasonic sensors, IMUs, tactile (e.g., touch) sensors, etc. As mentioned above, adding too many simulated sensors can be computationally expensive for the system rendering the simulated environment. Accordingly, the set of additional simulated sensors may include a minimum combination of one or more additional simulated sensors that are sufficient to identify a path for rescuing the robot. These may be added to simulations of the actual sensors that the robot possesses.

In at least one embodiment, the system generates a simulated environment including a designated rescue simulated robot that has a set of simulated sensors to generate simulated sensor data that is used to rescue a real robot stuck within a real environment. The rescue simulated robot can be generated as an additional robot within the simulated environment that does not correspond to any real robots within the real environment. For example, the system can, upon detecting a real robot that is stuck within the real environment, initiate a rescue of the real robot using a rescue simulated robot operating within the simulated environment. The simulated sensor data generated by the set of simulated sensors of the rescue simulated robot can be used to identify a path defining free space for the real robot to navigate within the real environment. For example, the system can fuse simulated sensor data from multiple simulated sensors to identify the path. Examples of sensors that can be included in the set of rescue simulated sensors include cameras, LiDAR sensors, RADAR sensors, SONAR sensors, ultrasonic sensors, IMUs, tactile (e.g., touch) sensors, etc.

Illustratively, a real robot within a real environment may have a forward-facing camera with an approximately 270° field of view and no additional sensors. There may be situations in which the real robot gets stuck during operation. For example, if the real robot is sufficiently close to a barrier (e.g., wall), then the real robot may not have the peripheral vision necessary to determine a path to navigate within the real environment. As another example, if the real environment is a dark environment, then there may not be sufficient light to enable the camera to generate suitable image data that the real robot can use to determine a path to navigate within the real environment. To get the real robot unstuck in such scenarios, the system can generate, in real-time or near real-time, a simulated environment (or use an already existing simulated environment, such as one that is dynamically updated based on changes to object/feature locations within the environment) to identify a path for a simulated robot, corresponding to the real robot stuck in the real environment, to navigate within the simulated environment (e.g., by adding at least one simulated sensor to the simulated robot, adding at least one simulated sensor to a different simulated robot, adding at least one simulated sensor within the simulated environment external to the simulated robots, and/or generating a rescue simulated robot). Illustratively, at least one LiDAR sensor can be added to the simulated robot (in addition to the forward-facing camera) that has an approximately 360° field of view. Upon identifying a path in the simulated environment, the system can cause the corresponding real robot to navigate the path identified in the simulated environment.

In at least one embodiment, the system generates a simulated environment modeling a real environment in real time or near real-time to enhance fleet monitoring of a fleet of real robots within the real environment. For example, the system can send, in real-time or near real-time to a fleet management device, hazard data identifying hazards within the simulated environment. Examples of hazards include (potential) congestion, cautioned paths, stuck robots, etc. The hazard data can be generated from sensor data collected from simulated sensors within the simulated environment. Since the simulated environment replicates the conditions of the real environment, the fleet management device can use the hazard data to improve its decision making ability with respect to operation of the fleet in the real environment, which can improve fleet management and reduce operational issues within the real environment.

In at least one embodiment, the system uses a simulated environment modeling a real environment to train a machine learning model (e.g., one or more neural networks) used by a real robot to navigate the real environment. For example, the machine learning model can be trained using simulated data collected during operation of simulated robots within multiple simulated environments and/or scenarios within the simulated environments. For example, the simulated data can include simulated sensor data obtained from simulated sensors, such as cameras, LiDAR sensors, RADAR sensors, SONAR sensors, ultrasonic sensors, IMUs, tactile (e.g., touch) sensors, etc. Further details regarding using simulated environments to improve autonomous robot operation (e.g., navigation and decision-making capabilities) in real environments will be described herein below.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), light transport simulation (e.g., ray-tracing, path tracing, etc.), generative AI applications, language model applications (e.g., large language models (LLMs), vision language models (VLMs), etc.), collaborative content creation for three-dimensional (3D) assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems for performing generative AI operations, systems implemented at least partially in a data center, systems for performing conversational AI operations, systems implementing one or more language models—such as an LLM, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

Advantages of embodiments described herein include, but are not limited to, increased operational efficiency of robots and/or fleet management devices, and decreased need for manual interventions.

FIGS. 1A-1B are block diagrams of an example system 100, according to at least one embodiment. The system 100 can include a real environment 102 having a fleet of robots 110-1 through 110-N, a robot control system 120 including a fleet management device (e.g., server) 125 for controlling operation of the fleet of real robots ("robots") 110-1 through 110-N, and a simulated environment generator 130 include at least one processing device 135. For example, the real environment 102 can be a factory, a warehouse, etc. In at least one embodiment, the robot control system 120 at a location within the real environment 102. In at least one embodiment, the robot control system 120 is at a location external to the real environment 102. In at least one embodiment, the simulated environment generator 130 is a component of the robot control system 120. In at least one embodiment, the simulated environment generator 130 is at a location within the real environment 102. In at least one embodiment, the simulated environment generator 130 is at a location external to the real environment 102.

Each of the robots 110-1 through 110-N can include a respective set of real sensors. For example, as shown in FIG. 1A, the real robot 110-1 can include a set of real sensors 112. The real environment 102 can further include a set of real sensors 125 located external to the robots 110-1 through 110-N. Examples of real sensors include cameras, LiDAR sensors, RADAR sensors, SONAR sensors, ultrasonic sensors, IMUs, tactile (e.g., touch) sensors, etc.

The simulated environment generator (or manager) 130 can generate (or manage an already generated) simulated environment 140 based on the real environment 102. The simulated environment generator 130 can use various sources of data to generate and/or keep up to date the simulated environment 140 in real-time or near real-time that accurately represent the real environment 102. Such data may include sensor data obtained from sensors in the real environment (e.g., real robot sensors and/or external sensors within the real environment), telemetry data, CAD models (e.g., of a warehouse or other area to be navigated by a robot), historical data, building planning data, and/or other relevant information. For example, the simulated environment generator 130 can initialize the simulated environment 140 from an initial set of data (e.g., CAD model, sensor data, etc.). The simulated environment generator 130 can then update (e.g., continuously update) the simulated environment 140 in real-time or near real-time based on real data obtained from the real environment 102 (e.g., sensor data from real robot sensors of one or more real robots and/or external sensors such as security cameras within the environment). For example, the system can identify, from the real data, that a new object exists in the real environment 102, and then update the simulated environment 140 to include the new object.

As shown in FIG. 1B, the simulated environment 140 can include at least one simulated robot 150 including a set of one or more simulated sensors 152, which may or may not correspond to real sensors. The simulated environment 140 can further include a set of simulated sensors 160 located external to any simulated robots of the simulated environment 140 (e.g., simulated robot 150). Each simulated sensor of the simulated environment 140 can be implemented using a sensor model designed to simulate behavior of a real sensor of the real environment 102. For example, a camera sensor model can be designed to simulate behavior of a real camera. A sensor model can be created based on sensor parameters, such as sampling rate, precision, noise levels, response time, calibration, and/or any other relevant parameters. A sensor model can be further created based on environmental parameters relating to environment factors that can impact sensor readings, such as temperature, humidity, vibration, and electromagnetic interference, etc. Examples of simulated sensors include cameras, LiDAR sensors, RADAR sensors, SONAR sensors, ultrasonic sensors, IMUs, tactile (e.g., touch) sensors, etc.

In at least one embodiment, the simulated robot 150 corresponds to the real robot 110-1 and the set of simulated sensors 152 is identical to the set of real sensors 112. In at least one embodiment, the simulated robot 150 corresponds to the real robot 110-1 and the set of simulated sensors 152 is not identical to the set of real sensors 112. More specifically, the set of simulated sensors 152 can be a modified version of the set of real sensors 112. For example, the set of simulated sensors 152 can include at least one additional sensor not included in the set of real sensors 112. As another example, the set of simulated sensors 152 can be generated by replacing at least one sensor having a first type of the set of sensors 112 with at least one sensor having a second type different from the first type (e.g., generate the set of simulated sensors 152 by replacing a LiDAR sensor of the set of real sensors 112 with a camera). In at least one embodiment, the simulated robot 150 is an additional robot (e.g., rescue robot) that does not correspond to any real robots 110-1 through 110-N of the real environment 102 that the simulated environment 140 is replicating and the set of simulated sensors 152 is an additional set of sensors that does not exist within the real environment 102.

The simulated environment generator 130 may generate the simulated environment 140 in real-time or near real-time during operation of robots 110-1 through 110-N. Generally, the simulated environment generator 130 can generate the simulated environment 140 to identify a path for at least one of robots 110-1 through 110-N to navigate within the real environment 102 (e.g., regardless of whether at least one of robots 110-1 through 110-N is stuck within the real environment 102). For example, various paths for the simulated robot 150 can be tested within the simulated environment 140, and an optimal path for the at least one simulated robot 150 can be identified as the path for at least one of robots 110-1 through 110-N to navigate in the real environment 102. Identifying the path for at least one of robots 110-1 through 110-N to navigate with the real environment 102 can include experimenting with alternative simulated paths within the simulated environment 140 and/or adding simulated sensors to the simulated environment 140 (e.g., the set of simulated sensors 152 or the set of simulated sensors 160) to enhance the perception and navigation capability of the at least one simulated robot 150.

A set of additional simulated sensors may be added to the simulated environment 140 to identify a path for at least one of robots 110-1 through 110-N to navigate within the real environment 102. Examples of additional simulated sensors include cameras, LiDAR sensors, RADAR sensors, SONAR sensors, ultrasonic sensors, IMUs, tactile (e.g., touch) sensors, etc. As mentioned above, adding too many simulated sensors can be computationally expensive for the system rendering the simulated environment. Accordingly, the set of additional simulated sensors may include a minimum combination of one or more additional simulated sensors that are sufficient to identify a path for the real robot to navigate within the real environment. The additional simulated sensors may be of a same type of sensor that the robot already possesses in the real-world and/or may be of a different type than those that the robot has in the real-world. For example, the robot may include one or more image sensors that operate under lighted conditions in the real-world, and in the simulated environment one or more infrared sensors, LiDAR sensors, etc. may be added that enable the robot to "see" in dark or low light conditions that the robot cannot ordinarily see under.

In at least one embodiment, processing logic initially adds one or a few additional simulated sensors (that do not correspond to real sensors) to a robot in the simulated environment when certain criteria are satisfied. The criteria may include a criterion that a robot is stuck, that a robot lacks a path to travel to a target location, that the robot lacks a target location, that the robot has malfunctioned, and so on. Different criteria may be associated with different sets of simulated sensors. Accordingly, depending on the situation of the robot in the real-world, different sets of simulated sensors may be activated for the robot. If a set of one or more simulated sensors is activated for a robot, and the robot is still unable to resolve a current problem (e.g., navigate around an obstacle or become unstuck), then one or more additional simulated sensors may be activated for the robot. This process may repeat until a solution (e.g., a path to navigate) has been determined for the robot in the simulated environment.

For example, the robot control system 120 can cause the simulated environment generator 130 to generate or instantiate a previously generated and up to date version of the simulated environment 140 upon detecting that the robot 110-1 has encountered a scenario or condition during operation in the real environment 102 in which the robot 110-1 fails to navigate the real environment 102 in an efficient manner. Alternatively, the simulated environment 140 may be generated before encountering such scenarios or conditions. Illustratively, if the robot 110-1 gets stuck while navigating the real environment 102, then the robot control system 120 can cause the simulated environment generator (or manager) 130 to generate or instantiate the simulated environment 140 in which simulated rescue strategies can be tested in real-time or near real-time. Accordingly, instead of relying on manual intervention, the robot control system 120 can cause the simulated environment generator 130 to generate or instantiate, in real-time or near real-time, the simulated environment 140 (or an instance thereof) to identify and test a simulated operational strategy within the simulated environment 140 before deployment to the robot 110-1.

A set of additional simulated sensors may be added to the simulated environment to identify paths for rescuing the robot 110-1. For example, the simulated robot 150 can correspond to the robot 110-1. The set of additional simulated sensors can include one or more additional simulated sensors attached to the simulated robot 150 corresponding to the robot 110-1, one or more additional simulated sensors attached to at least one simulated robot corresponding to at least one of robots 110-2 through 110-N, and/or one or more additional simulated sensors external to (and not necessarily located or positioned based on physical constraints) any simulated robots within the simulated environment 140. Examples of additional simulated sensors include cameras, LiDAR sensors, RADAR sensors, SONAR sensors, ultrasonic sensors, IMUs, tactile (e.g., touch) sensors, etc. In at least one embodiment, the set of additional simulated sensors includes a minimum combination of additional simulated sensors that are sufficient to identify a path for rescuing the robot 110-1.

In at least one embodiment, the simulated robot 150 is a designated rescue simulated robot, not corresponding to any of the robots 110-1 through 110-N, to rescue the robot 110-1. For example, upon detecting that the robot 110-1 is stuck within the real environment, the robot control system 120 can initiate a rescue of the robot 110-1 by causing the simulated environment generator 130 to generate or update an instantiation of the simulated environment 140 to include the rescue simulated robot. The simulated sensor data generated by the set of simulated sensors of the rescue simulated robot can be used to identify a path defining free space for the robot 110-1 to navigate within the real environment 102. For example, the system can fuse simulated sensor data from multiple simulated sensors to identify the path. Examples of sensors that can be included in the set of rescue simulated sensors include cameras, LiDAR sensors, RADAR sensors, SONAR sensors, ultrasonic sensors, IMUs, tactile (e.g., touch) sensors, etc.

In at least one embodiment, the robot control system 120 causes the simulated environment generator 130 to generate or instantiate the simulated environment 140 in real time or near real-time to enhance fleet monitoring of the robots 110-1 through 110-N. For example, the simulated data obtained from the simulated environment 140 can include hazard data identifying hazards within the simulated environment 140. Examples of hazards include (potential) congestion, cautioned paths, stuck robots, etc. The hazard data can be generated from simulated sensor data collected from simulated sensors within the simulated environment 140. Since the simulated environment 140 replicates the conditions of the real environment 102, the fleet management device 125 can use the hazard data to improve its decision making ability with respect to operation of the robots 110-1 through 110-N, which can improve fleet management and reduce operational issues within the real environment 102.

Accordingly, system 100 can be used to control a real robot through a real world environment based at least on data corresponding to a digital twin of the real world environment, where the digital twin includes a virtual representation of the real robot including a simulated sensor set different from a sensor set of the real robot.

In at least one embodiment, the system 100 uses simulated data obtained from the simulated environment 140 to train at least one machine learning model (e.g., one or more neural networks) used by the robots 110-1 through 110-N to navigate the real environment 102. For example, the at least one machine learning model can be trained using simulated data collected during operation of at least one simulated robot within multiple simulated environments and/or scenarios within the simulated environments. In at least one embodiment, simulated data can include simulated sensor data obtained from simulated sensors. Examples of simulated sensors include cameras, LiDAR sensors, RADAR sensors, SONAR sensors, ultrasonic sensors, IMUs, tactile (e.g., touch) sensors, etc.

In at least one embodiment, system 100 is included in a control system for an autonomous or semi-autonomous machine. In at least one embodiment, system 100 is included in a perception system for an autonomous or semi-autonomous machine. In at least one embodiment, system 100 is included in a system for performing one or more simulation operations. In at least one embodiment, system 100 is included in a system for performing one or more digital twin operations. In at least one embodiment, system 100 is included in a system for performing light transport simulation. In at least one embodiment, system 100 is included in a system for performing collaborative content creation for 3D assets. In at least one embodiment, system 100 is included in a system for performing one or more deep learning operations. In at least one embodiment, system 100 is included in a system for presenting at least one of augmented reality (AR) content, virtual reality (VR) content, or mixed reality (MR) content. In at least one embodiment, system 100 is included in a system for hosting one or more real-time streaming applications. In at least one embodiment, system 100 is included in a system implemented using an edge device. In at least one embodiment, system 100 is included in a system implemented using a robot. In at least one embodiment, system 100 is included in a system for performing one or more conversational AI operations. In at least one embodiment, system 100 is included in a system implementing one or more language models. In at least one embodiment, system 100 is included in a system implementing one or more LLMs. In at least one embodiment, system 100 is included in a system implementing one or more VLMs. In at least one embodiment, system 100 is included in a system for performing one or more generative AI operations. In at least one embodiment, system 100 is included in a system for generating synthetic data. In at least one embodiment, system 100 is included in a system incorporating one or more VMs. In at least one embodiment, system 100 is included in a system implemented at least partially in a data center. In at least one embodiment, system 100 is included in a system implemented at least partially using cloud computing resources.

FIG. 2A is a flow diagram of an example method 200A of using simulated environments to improve autonomous robot operation (e.g., navigation and decision-making capabilities) in real-world environments, according to at least one embodiment. In at least one embodiment, method 200A may be performed using multiple processing threads (e.g., CPU threads and/or GPU threads), with individual threads executing one or more individual functions, routines, subroutines, or operations of the methods. In at least one embodiment, processing threads implementing method 200A may be synchronized (e.g., using semaphores, critical sections, and/or other thread synchronization mechanisms). Alternatively, processing threads implementing method 200A may be executed asynchronously with respect to each other. Various operations of method 200A may be performed in a different order compared with the order shown in FIG. 2A. Some operations of method 200A may be performed concurrently with other operations. In at least one embodiment, one or more operations shown in FIG. 2A may not always be performed. Method 200A may be performed using one or more processing units of robot control system 120 and/or simulated environment generator 130 of FIG. 1, the processing units including (or communicating with) one or more memory devices. Examples of processing units include central processing units (CPUs), graphics processing units (GPUs), accelerators, physical processing units (PPUs), data processing units (DPUs), tensor processing units (TPUs), etc.

At operation 210A, processing logic generates (or instantiates), for a real environment including at least one real robot having one or more real sensors, a simulated environment modeling the real environment in real-time or near real-time. The simulated environment can include at least one simulated robot corresponding to the at least one real robot. In at least one embodiment, the real environment includes multiple real robots, and the simulated environment includes multiple simulated robots each corresponding to a respective real robot of the real environment.

The at least one simulated robot can include one or more simulated sensors corresponding to the one or more real sensors. In at least one embodiment, the simulated environment includes one or more additional sensors external to the at least one robot. Examples of sensors include cameras, LiDAR sensors, RADAR sensors, SONAR sensors, ultrasonic sensors, IMUs, tactile (e.g., touch) sensors, etc.

At operation 220A, processing logic obtains simulated data. For example, the simulated data can be obtained based on simulated sensor data collected from the one or more simulated sensors. In at least one embodiment, the simulated data is further obtained based on simulated sensor data collected from the one or more additional sensors.

At operation 230A, processing logic uses the simulated data to control operation of the at least one real robot within the real environment. In at least one embodiment, using the simulated data to control operation of the at least one real robot includes sending the simulated data to a fleet management server to control operation of the at least one real robot. In at least one embodiment, the at least one real robot uses at least one machine learning model trained to navigate the real environment based on real sensor data.

In at least one embodiment, using the simulated data to control operation of the at least one real robot within the real environment includes determining at least one strategy for the at least one real robot to overcome an obstacle within the real environment based on the simulated data, and deploying the at least one strategy to the at least one real robot. In at least one embodiment, generating the simulated environment includes initializing the at least one simulated robot with at least one base set of simulated sensors. In at least one embodiment, identifying the at least one strategy includes adding at least one additional simulated sensor to the at least one base set of simulated sensors, where the at least one real robot lacks at least one real sensor corresponding to the at least one additional simulated sensor. Accordingly, additional simulated data can be obtained from the at least one additional simulated sensor, which can be used to control operation of the at least one real robot within the real environment.

In at least one embodiment, using the simulated data to control operation of the at least one real robot within the real environment includes identifying a path for the at least one real robot to navigate within the real environment, and causing the at least one real robot to navigate the path in the real environment. In at least one embodiment, identifying a path for a real robot to navigate within the real environment includes, for the simulated robot corresponding to the real robot, identifying one or more candidate paths for the simulated robot to navigate in the simulated environment, and selecting the path from the one or candidate paths.

In at least one embodiment, using the simulated data to control operation of a real robot within the real environment includes determining that a simulated robot corresponding to the real robot is unable to navigate an obstacle based on the simulated data collected from the one or more simulated sensors, generating an additional simulated sensor for the simulated robot in the simulated environment, where the real robot lacks a real sensor corresponding to the additional simulated sensor, obtaining additional simulated data based on the additional simulated sensor, determining a path for the simulated robot to travel based at least in part on the additional simulated data, and causing the real robot to navigate the obstacle according to the path. In at least one embodiment, using the simulated data to control operation of a real robot within the real environment includes determining that the real robot has navigated the obstacle and, in response to determining that the real robot has navigated the obstacle, disabling the additional simulated sensor in the simulated environment.

Figure 2B:
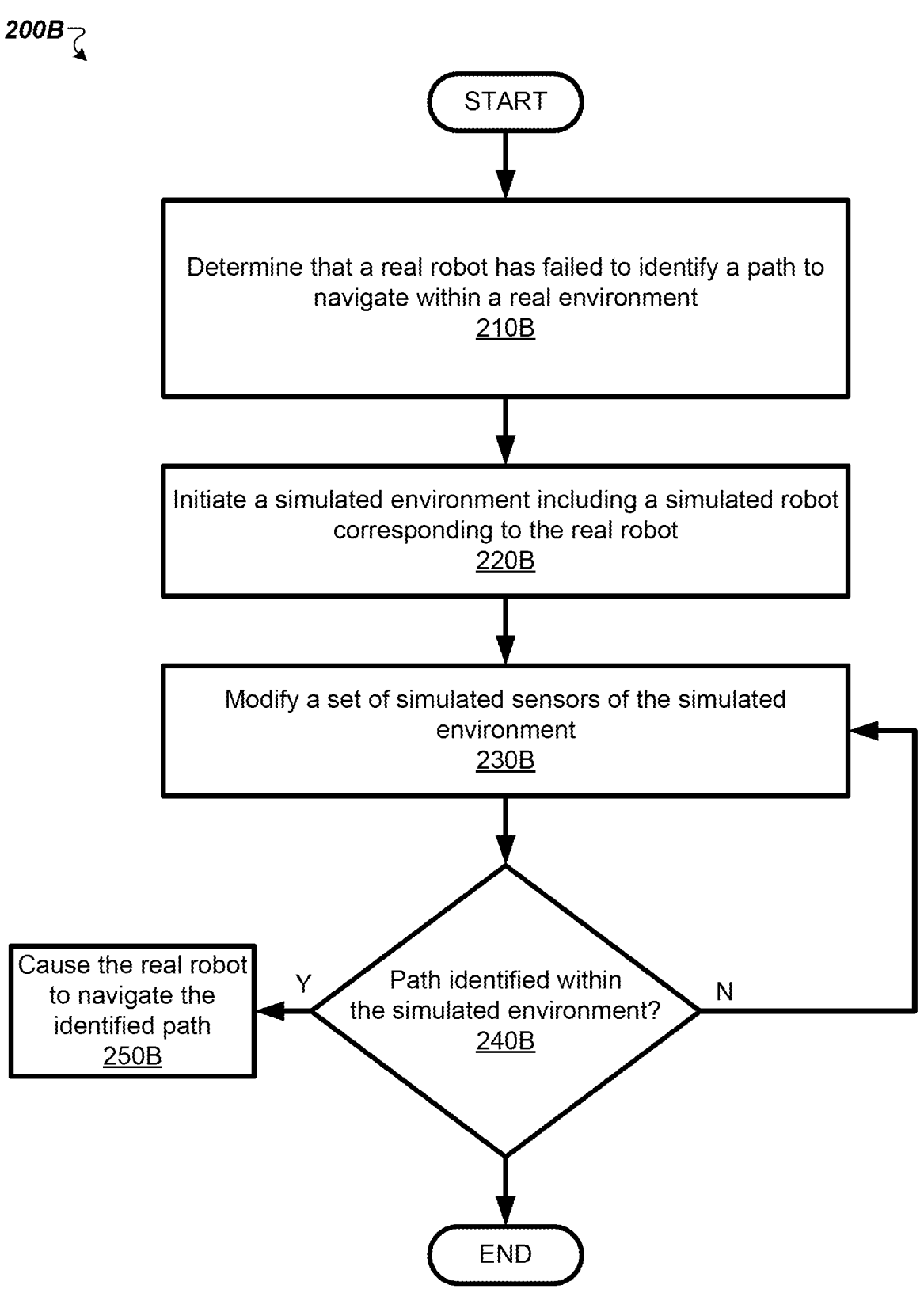
FIG. 2B is a further flow diagram of an example method of using simulated environments to improve autonomous robot operation (e.g., navigation and decision-making capabilities) in real-world environments, according to at least one embodiment.

FIG. 2B is a flow diagram of an example method 200B of using simulated environments to improve autonomous robot operation (e.g., navigation and decision-making capabilities) in real-world environments, according to at least one embodiment. In at least one embodiment, method 200B may be performed using multiple processing threads (e.g., CPU threads and/or GPU threads), with individual threads executing one or more individual functions, routines, subroutines, or operations of the methods. In at least one embodiment, processing threads implementing method 200B may be synchronized (e.g., using semaphores, critical sections, and/or other thread synchronization mechanisms). Alternatively, processing threads implementing method 200B may be executed asynchronously with respect to each other. Various operations of method 200B may be performed in a different order compared with the order shown in FIG. 2B. Some operations of method 200B may be performed concurrently with other operations. In at least one embodiment, one or more operations shown in FIG. 2B may not always be performed. Method 200B may be performed using one or more processing units (e.g., CPUs, GPUs, accelerators, PPUs, DPUs, etc.) of robot control system 120 and/or simulated environment generator 130 of FIG. 1, the processing units including (or communicating with) one or more memory devices.

At operation 210B, processing logic determines that a real robot has failed to identify a path to navigate within a real environment. For example, the real robot can be determined to be stuck within the real environment. The real robot can include a set of real sensors, as described above with reference to FIGS. 1A-2A. Examples of sensors that can be included in the set of real sensors include cameras, LiDAR sensors, RADAR sensors, SONAR sensors, ultrasonic sensors, IMUs, tactile (e.g., touch) sensors, etc.

At operation 220B, processing logic may initiate or instantiate a simulated environment including a simulated robot corresponding to the real robot. Alternatively, the simulated environment including the simulated robot may have previously been initiated, and may be updated in real time or near-real time to reflect a current state of the robot. In an example, the simulated environment can be a digital twin of the real environment, as described above with reference to FIGS. 1A-2A. The simulated robot can include a set of onboard simulated sensors corresponding to the set of real sensors.

At operation 230B, processing logic modifies a set of simulated sensors of the simulated environment. For example, the set of simulated sensors can include the set of onboard simulated sensors of the simulated robot. In at least one embodiment, modifying the set of simulated sensors includes adding one or more onboard simulated sensors to the set of onboard simulated sensors. Examples of onboard sensors that can be added to the set of simulated sensors include cameras, LiDAR sensors, RADAR sensors, SONAR sensors, ultrasonic sensors, IMUs, tactile (e.g., touch) sensors, etc.

In at least one embodiment, modifying the set of simulated sensors includes adding one or more external simulated sensors not included in the set of onboard simulated sensors. More specifically, each external simulated sensor can be placed within a respective location of the simulated environment external to the simulated robot. Examples of external simulated sensors that can be added to the set of simulated sensors include cameras, LiDAR sensors, RADAR sensors, SONAR sensors, ultrasonic sensors, IMUs, tactile (e.g., touch) sensors, etc.

In at least one embodiment, modifying the set of simulated sensors includes replacing at least one onboard simulated sensor with a different type of onboard simulated sensor. For example, an onboard camera can be replaced with an onboard LiDAR sensor. In at least one embodiment, modifying the set of simulated sensors includes replacing at least one external simulated sensor with a different type of external simulated sensor. For example, an external camera can be replaced with an external LiDAR sensor.

In at least one embodiment, one or more additional simulated sensors are added for the simulated robot that do not have real-world counterparts. In embodiments, processing logic may select one or more additional simulated sensors to add based on one or more sensor selection criteria. The sensor criteria a criterion for a type of robot, for a current situation of the robot, and/or other criteria.

At operation 240B, processing logic determines whether a path has been identified within the simulated environment. More specifically, processing logic determines whether the set of simulated sensors, modified at operation 230B, has identified a path within the simulated environment for the simulated robot to navigate. If not, the process reverts back to operation 230B to modify the set of simulated sensors. If a path has been identified with the simulated environment at operation 240B, then processing logic at operation 250B causes the real robot to navigate the identified path within the real environment.

Adding simulated sensors to the simulated environment comes at the cost of increased computation resource consumption. Therefore, it may not be computationally feasible to have processing logic naively add multiple simulated sensors to the simulated environment. To address this, operations 230B-250B can be performed in a computational efficient manner. For example, modifying the set of simulated sensors at operation 230B can be performed in a computationally efficient manner that minimizes consumption of computational resources used by the simulated environment generator to generate the simulated environment. Further details regarding operations 210B-240B are described above with reference to FIGS. 1A-2A, and will now be described below with reference to FIGS. 3A-3B.

Accordingly, method 200A of FIG. 2A and/or method 200B of FIG. 2B may be used to control a real robot through a real world environment based at least on data corresponding to a digital twin of the real world environment, the digital twin including a virtual representation of the real robot including a simulated sensor set different from a sensor set of the real robot.

Figure 3A:
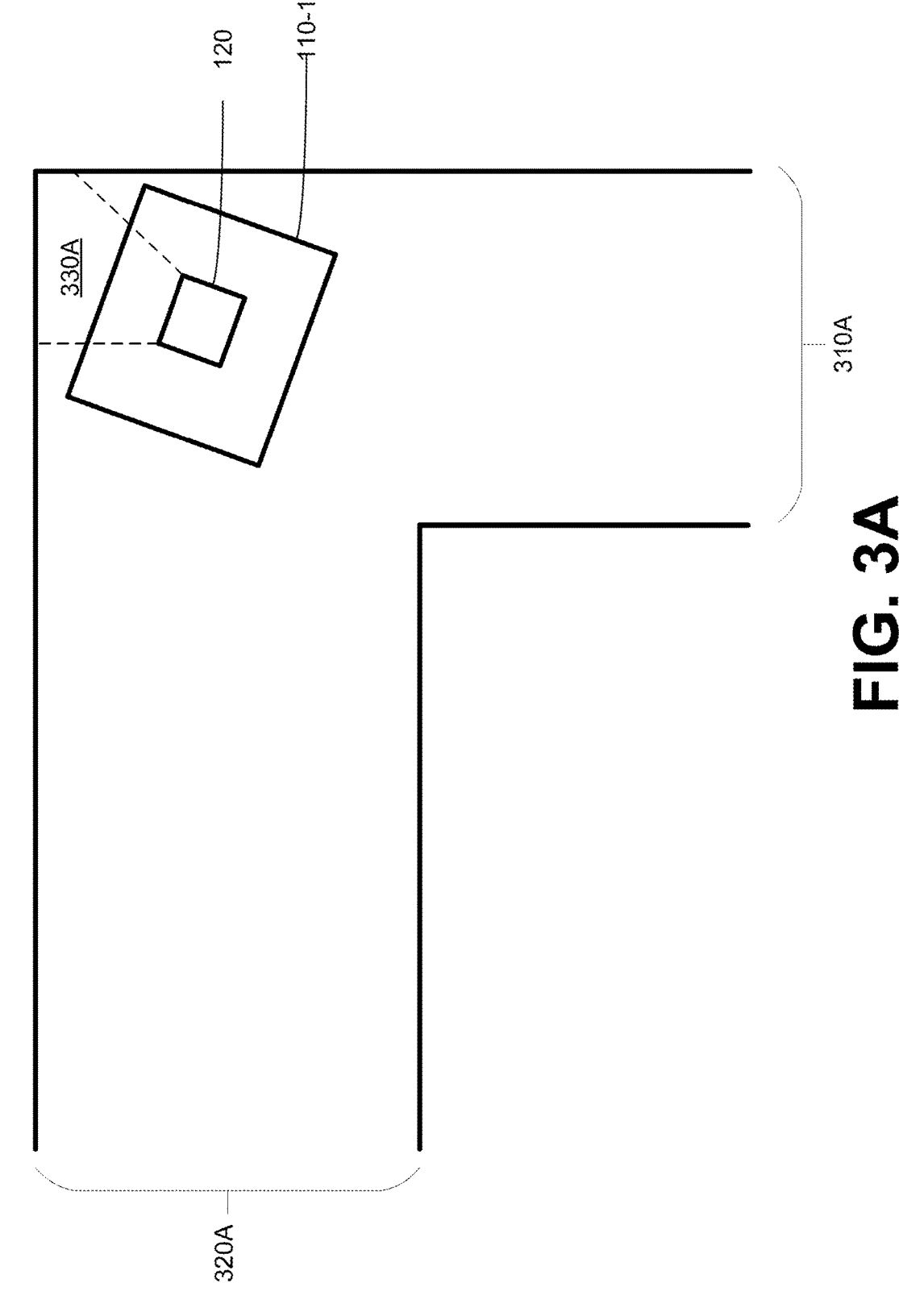
FIGS. 3A-3B are diagrams of top-down views illustrating an example implementation of using simulated environments to improve autonomous robot operation (e.g., navigation and decision-making capabilities) in real-world environments, according to at least one embodiment.
Figure 3B:
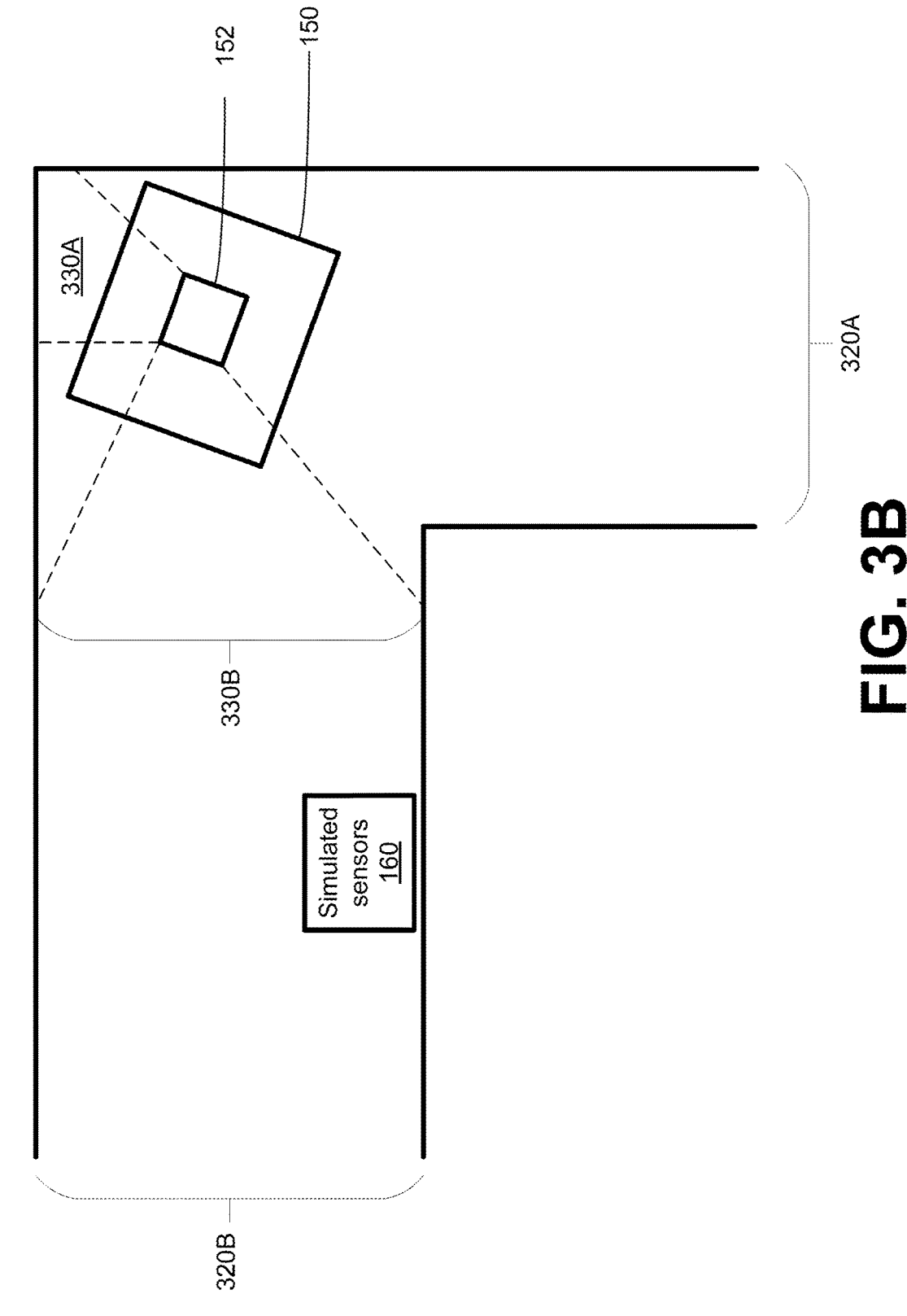

FIGS. 3A-3B are diagrams of top-down views illustrating an example implementation of using simulated environments to improve autonomous robot operation (e.g., navigation and decision-making capabilities) in real-world environments, according to at least one embodiment. For example, FIG. 3A shows a real-world ("real") environment 300A including the robot 110-1 having the set of sensors 120, as described above with reference to FIG. 1A. It is assumed that the robot 110-1 is attempting to navigate from end 310A toward end 320A. The set of sensors 120 has a field of vision (FOV) 330A. In this example, the robot 110-1 has encountered a scenario in which it has deviated from its path from end 310A toward end 320A, is stuck in a corner within the real environment 300A, and cannot use its sensors 120 to escape due to the limited FOV 330A.

FIG. 3B shows a simulated environment 300B modeling the real environment 300A. For example, the simulated environment 300B can be generated in real-time or near real-time by the simulated environment generator 130 (e.g., in response to detecting that the robot 110-1 is stuck in the corner). The simulated environment 300B includes the simulated robot 150 having the set of simulated sensors 152, as described above with reference to FIG. 1B. The simulated robot 150 can have a simulated FOV 330B obtained by at least the set of simulated sensors 152. In at least one embodiment, the simulated environment 300B can further include the set of simulated sensors 160 located external to the simulated robot 150, as described above with reference to FIG. 1B, and the simulated FOV 330B is enhanced by the set of simulated sensors 160. The simulated FOV 330B can identify a path within the simulated environment 300B toward end 320B that the simulated robot 150 can navigate. In turn, the robot control system 120 can cause the robot 110-1, in the real environment 300A, to navigate the path identified in the simulated environment 300B.

Figure 4:
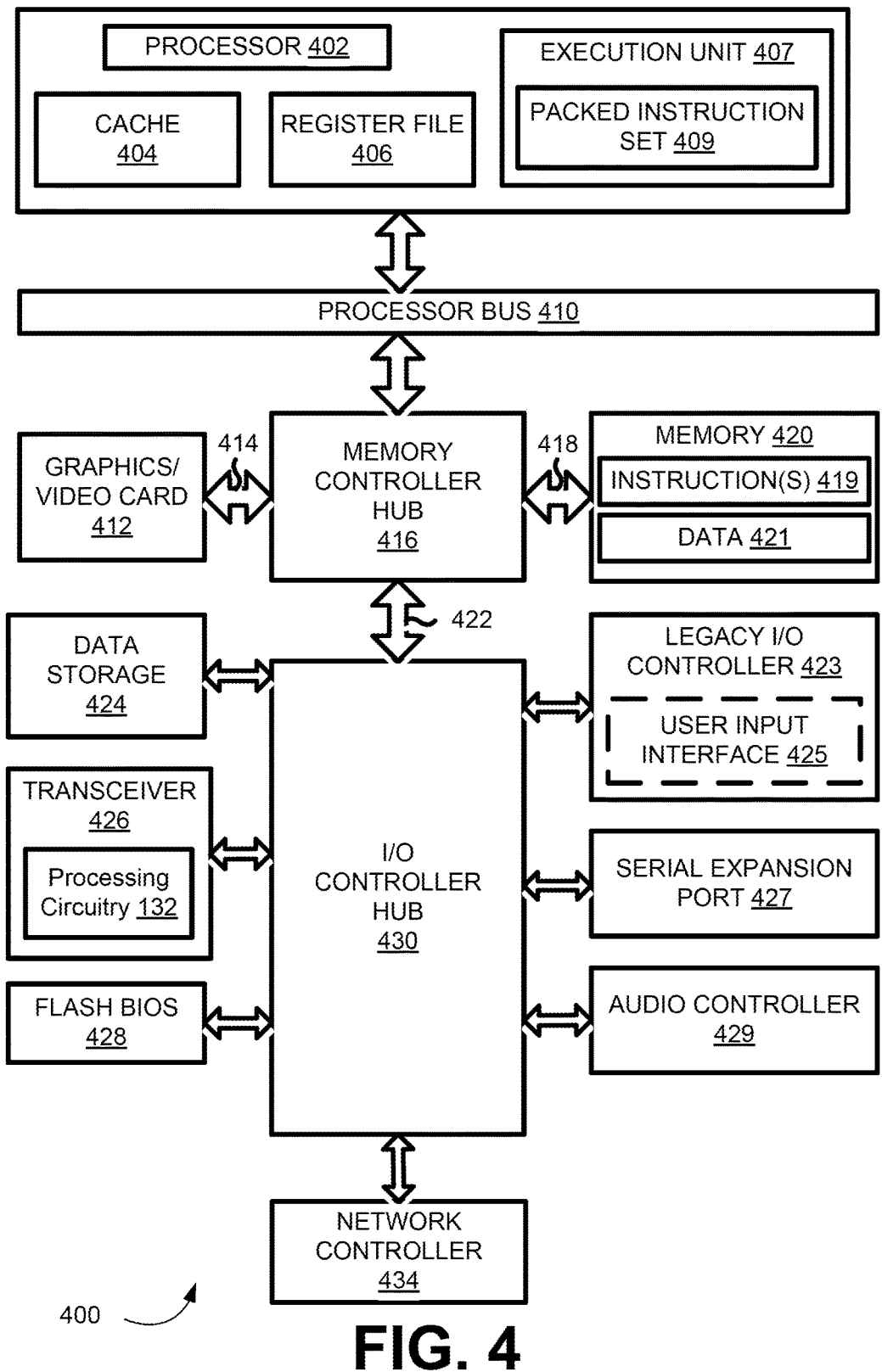
FIG. 4 is a diagram of an example computer system, according to at least one embodiment.

FIG. 4 illustrates a computer system 400, in accordance with at least one embodiment. In at least one embodiment, computer system 400 may be a system with interconnected devices and components, a system-on-chip (SOC), or some combination. In at least one embodiment, computer system 400 is formed with a processor 402 that may include execution units to execute an instruction. In at least one embodiment, computer system 400 may include, without limitation, a component, such as processor 402 to employ execution units including logic to perform algorithms for processing data. In at least one embodiment, computer system 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used.

In at least one embodiment, computer system 400 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 400 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 400 may include, without limitation, processor 402 that may include, without limitation, one or more execution units 407 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 400 is a single processor desktop or server system. In at least one embodiment, computer system 400 may be a multiprocessor system. In at least one embodiment, processor 402 may include, without limitation, a CISC microprocessor, a RISC microprocessor, a VLIW microprocessor, a processor implementing a combination of instruction sets, or any other processor device, such as a digital signal processor, for example. In at least one embodiment, processor 402 may be coupled to a processor bus 410 that may transmit data signals between processor 402 and other components in computer system 400.

In at least one embodiment, processor 402 may include, without limitation, a Level 1 ("L1") internal cache memory ("cache") 404. In at least one embodiment, processor 402 may have a single internal cache or multiple levels of internal cache. In at least one embodiment, cache memory may reside external to processor 402. In at least one embodiment, processor 402 may also include a combination of both internal and external caches. In at least one embodiment, a register file 406 may store different types of data in various registers including, without limitation, integer registers, floating point registers, status registers, and instruction pointer register.

In at least one embodiment, execution unit 407, including, without limitation, logic to perform integer and floating point operations, also resides in processor 402. Processor 402 may also include a microcode ("ucode") read only memory ("ROM") that stores microcode for certain macro instructions. In at least one embodiment, execution unit 402 may include logic to handle a packed instruction set 409. In at least one embodiment, by including packed instruction set 409 in an instruction set of a general-purpose processor 402, along with associated circuitry to execute instructions, operations used by many multimedia applications may be performed using packed data in a general-purpose processor 402. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 400 may include, without limitation, a memory 420. In at least one embodiment, memory 420 may be implemented as a DRAM device, an SRAM device, flash memory device, or other memory device. Memory 420 may store instruction(s) 419 and/or data 421 represented by data signals that may be executed by processor 402.

In at least one embodiment, a system logic chip may be coupled to processor bus 410 and memory 420. In at least one embodiment, the system logic chip may include, without limitation, a memory controller hub ("MCH") 416, and processor 402 may communicate with MCH 416 via processor bus 410. In at least one embodiment, MCH 416 may provide a high bandwidth memory path 418 to memory 420 for instruction and data storage and for storage of graphics commands, data and textures. In at least one embodiment, MCH 416 may direct data signals between processor 402, memory 420, and other components in computer system 400 and to bridge data signals between processor bus 410, memory 420, and a system I/O 422. In at least one embodiment, system logic chip may provide a graphics port for coupling to a graphics controller. In at least one embodiment, MCH 416 may be coupled to memory 420 through high bandwidth memory path 418 and graphics/video card 412 may be coupled to MCH 416 through an Accelerated Graphics Port ("AGP") interconnect 414.

In at least one embodiment, computer system 400 may use system I/O 422 that is a proprietary hub interface bus to couple MCH 416 to I/O controller hub ("ICH") 430. In at least one embodiment, ICH 430 may provide direct connections to some I/O devices via a local I/O bus. In at least one embodiment, local I/O bus may include, without limitation, a high-speed I/O bus for connecting peripherals to memory 420, a chipset, and processor 402. Examples may include, without limitation, an audio controller 429, a firmware hub ("flash BIOS") 428, a transceiver 426, a data storage 424, a legacy I/O controller 423 containing a user input interface 425 and a keyboard interface, a serial expansion port 427, such as a USB, and a network controller 434. Data storage 424 may comprise a hard disk drive, a floppy disk drive, a CD-ROM device, a flash memory device, or other mass storage device.

In at least one embodiment, devices illustrated in FIG. 4 may be interconnected with proprietary interconnects, standardized interconnects (e.g., PCIe), or some combination thereof. In at least one embodiment, one or more components of system 400 are interconnected using compute express link ("CXL") interconnects. In at least one embodiment, the transceiver 426 can include processing circuitry 132 as described with reference to FIG. 1. In such embodiments, the computer system 400 can facilitate a method to use simulated environments to improve autonomous robot operations in real environments, such as that described above with reference to FIGS. 1A-3B.

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
one or more processors to:
    determine, responsive to data received from a real robot having one or more real sensors and operating in a real environment, that the real robot is unable to navigate from a current state of the real robot within the real environment;
    responsive to the real robot being unable to navigate from the current state, instantiate a simulated environment modeling the real environment, the simulated environment including a simulated robot corresponding to the real robot, the simulated robot including one or more simulated sensors including at least one simulated sensor different from the one or more real sensors;
    obtain simulated data based at least on simulated sensor data collected using the one or more simulated sensors; and
    use the simulated data to control operation of the real robot within the real environment in order to navigate the real robot from the current state.

2. The system of claim 1, wherein the one or more simulated sensors comprise at least one of: a camera, a LiDAR sensor, a RADAR sensor, a SONAR sensor, an ultrasonic sensor, an inertial measurement unit (IMU), or a tactile sensor.

3. The system of claim 1, wherein the one or more processors are further to:
    determine that the real robot is unable to navigate from the current state by determining that the real robot is unable to navigate an obstacle, wherein the instantiation of the simulated environment is based at least on the determination that the real robot is unable to navigate the obstacle.

4. The system of claim 1, wherein the one or more processors are further to:
    determine that the real robot has navigated from the current state; and
    in response to determining that the real robot has navigated from the current state, disable the at least one simulated sensor different from the one or more real sensors in the simulated environment.

5. The system of claim 1, wherein, to use the simulated sensor data to control operation of the real robot, the one or more processors are to:
    determine a strategy for the real robot to navigate from the current state based at least on the simulated data; and
    deploy the strategy to the real robot.

6. The system of claim 5, wherein the at least one simulated sensor different from the one or more real sensors is identified based at least on the strategy.

7. The system of claim 1, wherein, to use the simulated data to control operation of the real robot in order to navigate the real robot from the current state, the one or more processors are to identify a path for the real robot to navigate within the real environment, and cause the real robot to navigate the path in the real environment.

8. The system of claim 7, wherein, to identify the path, the one or more processors are further to:

identify one or more candidate paths for the simulated robot to navigate in the simulated environment; and
    select the path from the one or candidate paths.

9. The system of claim 1, wherein, to use the simulated data to control operation of the real robot, the one or more processors are to send the simulated data to a fleet management server to control operation of the real robot.

10. The system of claim 1, wherein the system is comprised in at least one of:
    a control system for an autonomous or semi-autonomous machine;
    a perception system for an autonomous or semi-autonomous machine;
    a system for performing one or more simulation operations;
    a system for performing one or more digital twin operations;
    a system for performing light transport simulation;
a system for performing collaborative content creation for three-dimensional (3D) assets;
    a system for performing one or more deep learning operations;
    a system for presenting at least one of augmented reality content, virtual reality content, or mixed reality content;
    a system for hosting one or more real-time streaming applications;
    a system implemented using an edge device;
    a system implemented using a robot;
    a system for performing one or more conversational artificial intelligence (AI) operations;
    a system implementing one or more language models;
    a system implementing one or more large language models (LLMs);
    a system implementing one or more vision language models (VLMs);
    a system for performing one or more generative AI operations;
    a system for generating synthetic data;
    a system incorporating one or more virtual machines (VMs);
    a system implemented at least partially in a data center; or
    a system implemented at least partially using cloud computing resources.

11. A method comprising:
determining, responsive to data received from a real robot having one or more real sensors and operating in a real environment, that the real robot is unable to navigate from a current state of the real robot within the real environment;
responsive to the real robot being unable to navigate from the current state, generating a simulated environment modeling the real environment, the simulated environment including a simulated robot corresponding to the real robot, the simulated robot including one or more simulated sensors corresponding to the one or more real sensors;
obtaining simulated data based at least on simulated sensor data collected using the one or more simulated sensors; and
using the simulated data to control operation of the real robot within the real environment in order to navigate the real robot from the current state.

12. The method of claim 11, wherein the one or more simulated sensors comprise at least one of: a camera, a LiDAR sensor, a RADAR sensor, a SONAR sensor, an ultrasonic sensor, an inertial measurement unit (IMU), or a tactile sensor.

13. The method of claim 11, further comprising:

determining that the simulated robot is unable to navigate from the current state based at least on the simulated data collected from the one or more simulated sensors;

generating an additional simulated sensor for the simulated robot in the simulated environment, wherein the real robot lacks a real sensor corresponding to the additional simulated sensor;

obtaining additional simulated data based at least on the additional simulated sensor;

determining a path for the simulated robot to travel based at least in part on the additional simulated data; and causing the real robot to navigate from the current state according to the path.

14. The method of claim 13, further comprising:

determining that the real robot has navigated from the current state; and in response to determining that the real robot has navigated from the current state, disabling the additional simulated sensor in the simulated environment.

15. The method of claim 11, wherein using the simulated data to control operation of the real robot in order to navigate the real robot from the current state comprises:

determining a strategy for the real robot to navigate the current state based at least on the simulated data; and deploying the strategy to the real robot.

16. The method of claim 15, wherein generating the simulated environment comprises initializing the simulated robot with a base set of simulated sensors, wherein the method further comprises adding at least one additional simulated sensor to the base set of simulated sensors to identify the strategy, and wherein the real robot lacks a real sensor corresponding to the at least one additional simulated sensor.

17. The method of claim 11, wherein using the simulated data to control operation of the real robot in order to navigate the real robot from the current state comprises:

identifying one or more candidate paths for the simulated robot to navigate in the simulated environment;

selecting a path from the one or more candidate paths; and causing the real robot to navigate the path in the real environment.

18. The method of claim 11, wherein using the simulated data to control operation of the real robot comprises sending the simulated data to a fleet management server to control operation of the real robot.

19. The method of claim 11, further comprising training, based at least on the simulated sensor data, at least one machine learning model, wherein the real robot uses the at least one machine learning model to navigate the real environment based at least on real sensor data.

20. At least one processor comprising processing circuitry to:

determine, responsive to data received from a real robot having one or more real sensors and operating in a real world environment, that the real robot is unable to navigate from a current state of the real robot within the real world environment;

responsive to the real robot being unable to navigate from the current state, cause simulated data to be obtained from a digital twin of the real world environment, the digital twin including a virtual representation of the real robot including a simulated sensor set different from a sensor set of the real robot, the simulated data including simulated sensor data obtained using the simulated sensor set; and control, using the simulated data, operation of the real robot through the real world environment in order to navigate the real robot from the current state.

* * * * *